(12) United States Patent
Liu et al.

(10) Patent No.: US 7,800,625 B2
(45) Date of Patent: Sep. 21, 2010

(54) AUTOMATIC PARAMETERS ADJUSTING SYSTEM AND METHOD FOR A DISPLAY DEVICE

(75) Inventors: Fang-Hua Liu, Shenzhen (CN); Shih-Fang Wong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 577 days.

(21) Appl. No.: 11/781,964

(22) Filed: Jul. 24, 2007

(65) Prior Publication Data

US 2008/0111830 A1    May 15, 2008

(30) Foreign Application Priority Data

Aug. 18, 2006    (CN)    .................... 2006 1 0062213

(51) Int. Cl.
  G09G 5/00    (2006.01)
  G09G 5/02    (2006.01)
  H04N 17/00   (2006.01)
  H04N 5/20    (2006.01)
  G06K 9/20    (2006.01)
  G06F 13/00   (2006.01)
  H04N 1/46    (2006.01)

(52) U.S. Cl. .................... 345/581; 345/428; 345/643; 345/538; 345/899; 348/180; 348/255; 348/229.1; 358/504; 711/100; 711/221; 382/274; 382/312

(58) Field of Classification Search ................ 345/426, 345/428, 581, 589, 520, 617, 548, 549, 556, 345/204, 690, 698–899, 63, 77, 619, 643, 345/606, 538; 348/180, 192, 208.13, 229.1, 348/255, 678; 702/85, 94, 97; 725/10, 12; 382/254, 274, 276, 300, 305, 312; 711/100, 711/221; 707/661, 705; 358/504

See application file for complete search history.

(56) References Cited

U.S. PATENT DOCUMENTS

| | | | | |
|---|---|---|---|---|
| 5,999,213 | A * | 12/1999 | Tsushima et al. | 348/180 |
| 6,373,961 | B1 * | 4/2002 | Richardson et al. | 382/103 |
| 6,592,223 | B1 | 7/2003 | Stern et al. | |
| 6,762,741 | B2 | 7/2004 | Weindorf | |
| 7,537,381 | B2 * | 5/2009 | Hollander et al. | 374/142 |
| 2003/0179198 | A1 * | 9/2003 | Uchiyama | 345/427 |
| 2004/0238732 | A1 * | 12/2004 | State et al. | 250/250 |
| 2005/0083512 | A1 * | 4/2005 | Stierle et al. | 356/4.01 |
| 2005/0190180 | A1 * | 9/2005 | Jin et al. | 345/419 |
| 2005/0229200 | A1 * | 10/2005 | Kirkland et al. | 725/12 |
| 2007/0189470 | A1 * | 8/2007 | Yoon | 379/88.13 |

* cited by examiner

*Primary Examiner*—Wesner Sajous
(74) *Attorney, Agent, or Firm*—Frank R. Niranjan

(57) ABSTRACT

A method of automatically adjusting parameters of a display device is provided. The method includes: measuring a current distance between a user and the display device; determining a particular distance range which the current distance falls in; determining corresponding parameter values of the particular distance range according to a parameter management table which lists a series of distance ranges and corresponding parameter values of the display device; transmitting the parameter values to the display device; adjusting parameters of the display device according to the parameter values.

8 Claims, 3 Drawing Sheets

AUTOMATIC PARAMETERS ADJUSTING SYSTEM AND METHOD FOR A DISPLAY DEVICE

BACKGROUND OF THE INVENTION

1. Field of the Invention

The present invention relates generally to an automatic parameter adjusting system and method for a display device.

2. Description of Related Art

With the development of electronic technology, electronic devices has become necessary tools in peoples' daily life. For either work and/or study, a user of the electronic device with a display such as computer needs to stare at the display most of the time of a day. Viewing a display over long periods of time causes discomfort to viewer's eyes. If the parameters of the display such as luminance, contrast, and color temperature are adjusted to an appropriate value, discomfort to the eyes can be reduced. Generally, the appropriate value of the parameters varies according to varying distances between the user and the display.

Generally, the parameters of the display device are controlled in relation to the environment of the display device and user's preferences. In a typical display device, a user adjusts the parameters manually. There may be a switch, a keypad, a touch screen, a remote device, or the like to adjust the parameters. The parameters usually remain at the fixed level until being manually modified by the user.

However, while using the display, a positioning of the user is not kept constant, the user may lean forwards or backwards while viewing the display. Thus, the distance between the user and the display is not constant. However, the parameter' values of the display is not changed with the change of positioning and it will cause discomforts to the eyes.

Additionally, when the user is temporary away from the display, the display maintains a fixed luminance, thus makes the display very energy inefficient.

Therefore, what is still needed is a system and method that can automatically adjust the parameters of the display in an appropriate value according to the change of the distance between the user and the display.

SUMMARY OF THE INVENTION

A method for automatically adjusting parameters of a display device is provided. The method includes the step of: measuring a distance between a user and the display device; determining a particular distance range which the current distance falls in; determining corresponding parameter values of the particular distance range according to a parameter management table which lists a series of distance ranges and corresponding parameter values of the display device; transmitting the parameter values to the display device; adjusting parameters of the display device according to the parameter values.

Other advantages and novel features will be drawn from the following detailed description of the preferred embodiment with reference to the attached drawings, in which:

DETAILED DESCRIPTION OF THE INVENTION

Figure 1:
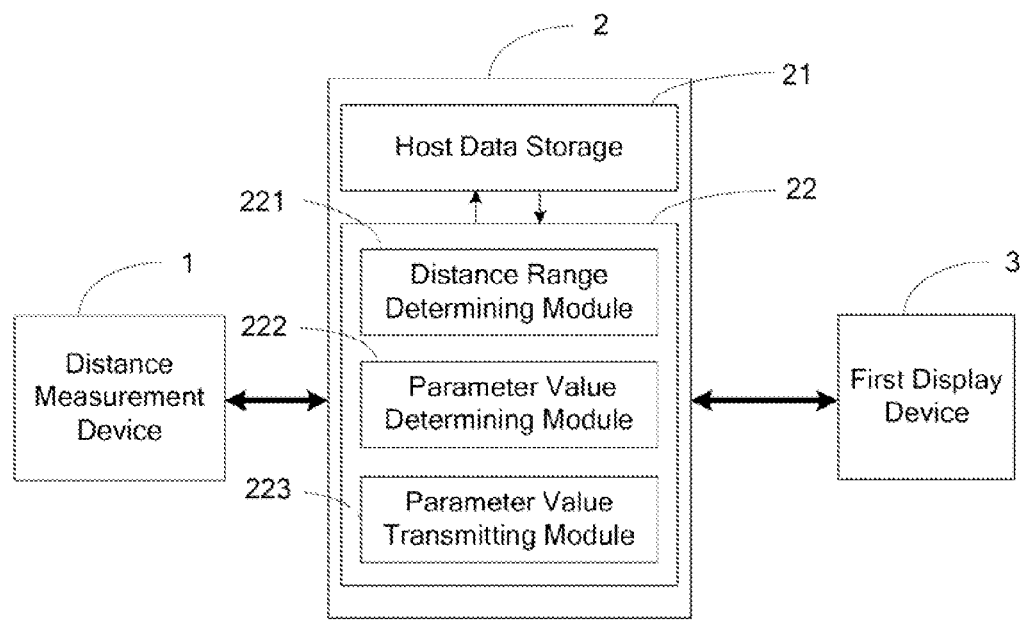
FIG. 1 is an exemplary hardware infrastructure diagram in accordance with a first preferred embodiment of the present invention.

FIG. 1 is an exemplary hardware infrastructure diagram of a system for automatically adjusting parameters of a first display device (hereafter "the system") in accordance with a first preferred embodiment of the present invention. The system includes a distance measurement device 1, a host 2, and a first display device 3. The distance measurement device 1 is fixed on the first display device 3 for measuring a distance between a user and the first display device 3 and transmitting the current distance to the host 2. The host 2 processes the current distance and generates a control instruction according to processed results, the control instructions are then sent to the first display device 3 to adjust display parameters, such as, for example, luminance, contrast, and color temperature.

The host 2 includes a host data storage 21 and a CPU (central processing unit) 22. The host data storage 21 stores a parameter management table. The parameter management table lists a series of distance ranges and corresponding parameter values of the first display device 3. Table 1 (below) shows a part of the parameter management table. Table 1 includes, for example, but not limited to, a distance range column, luminance parameter column, contrast parameter column, and color temperature parameter column. Each entry under the distance range column records a particular distance range between the user and the first display device 3. Each entry under luminance, contrast, and color temperature column records a corresponding parameter value at a corresponding distance range respectively. The parameter values corresponding to the particular distance range can be modified to comfort user's eyes.

TABLE 1

| Distance Range | Luminance | Contrast | Color Temperature |
|---|---|---|---|
| ... | ... | ... | ... |
| 30-50 cm | 30 | 40 | 4500k |
| 50-70 cm | 40 | 50 | 5500K |
| 70-90 cm | 50 | 60 | 6500K |
| ... | ... | ... | ... |

In table 1, a last entry of distance range column records a threshold distance (e.g., "200 cm"). The threshold distance is a distance that indicates the user is not using the display. Corresponding to the last entry of distance range column, a last entry of luminance parameter column records a threshold luminance value (e.g., "0") at which the luminance of the first display device 3 is adjusted to the threshold luminance value for saving power. In addition, in this preferred embodiment, when the user is away from the first display device 3, the distance measurement device 1 would not detect the user, the distance measurement device 1 would determine that the distance between the user and the first display device 3 as the last entry of distance range column such as greater than or equal to 200 cm".

The CPU 22 includes a distance range determining module 221, a parameter value determining module 222, and a parameter value transmitting module 223.

Figure 2:
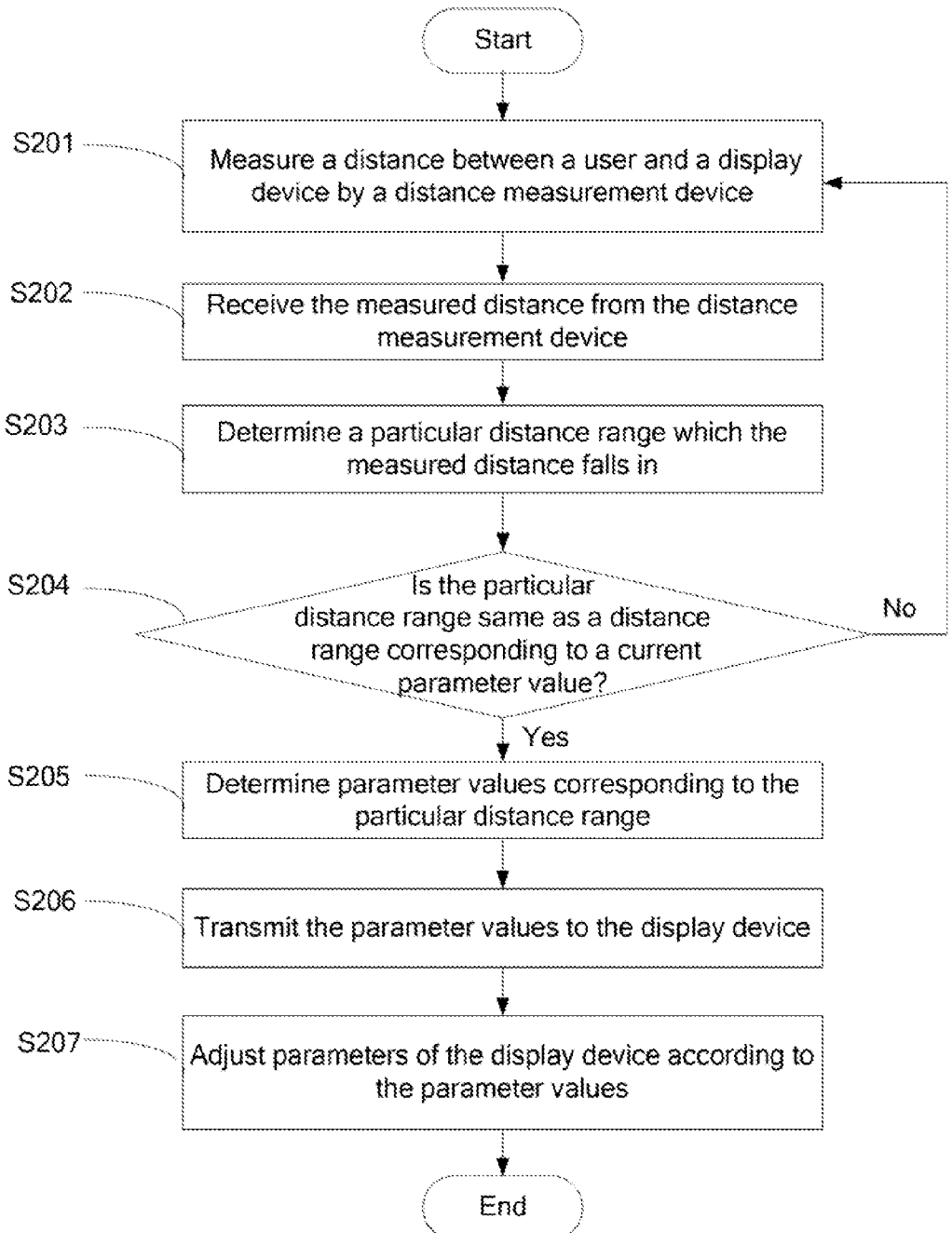
FIG. 2 is a flowchart of a preferred method of automatically adjusting parameters

Referring to FIG. 2, a flowchart of a preferred method of automatically adjusting parameters for the first display device 3 is shown.

In step S201, the distance measurement device 1 detects a current distance between the user and the first display device 3.

In step S202, the distance range determining module 221 receives the current distance from the distance measurement device 1.

In step S203, the distance range determining module 221 determines the distance range entry in the parameter management table containing the current distance.

In step S204, the parameter value determining module 222 compares current parameter values of the display with the parameter values entries corresponding the distance range entry containing the current distance. If the current parameter values of the display is the same as the parameter values entries corresponding the distance range entry, the procedure returns to step S201 described above, otherwise, the procedure goes to step S205 described below.

In step S205, the parameter value determining module 222 reads new parameter values corresponding the distance range entry in the parameter management table.

In step S206, the parameter value transmitting module 223 transmits the new parameter values to the first display device 3.

In step S207, the display device 3 receives the new parameter values and adjusts the parameters of the first display device 3 according to the new parameter values.

Figure 3:
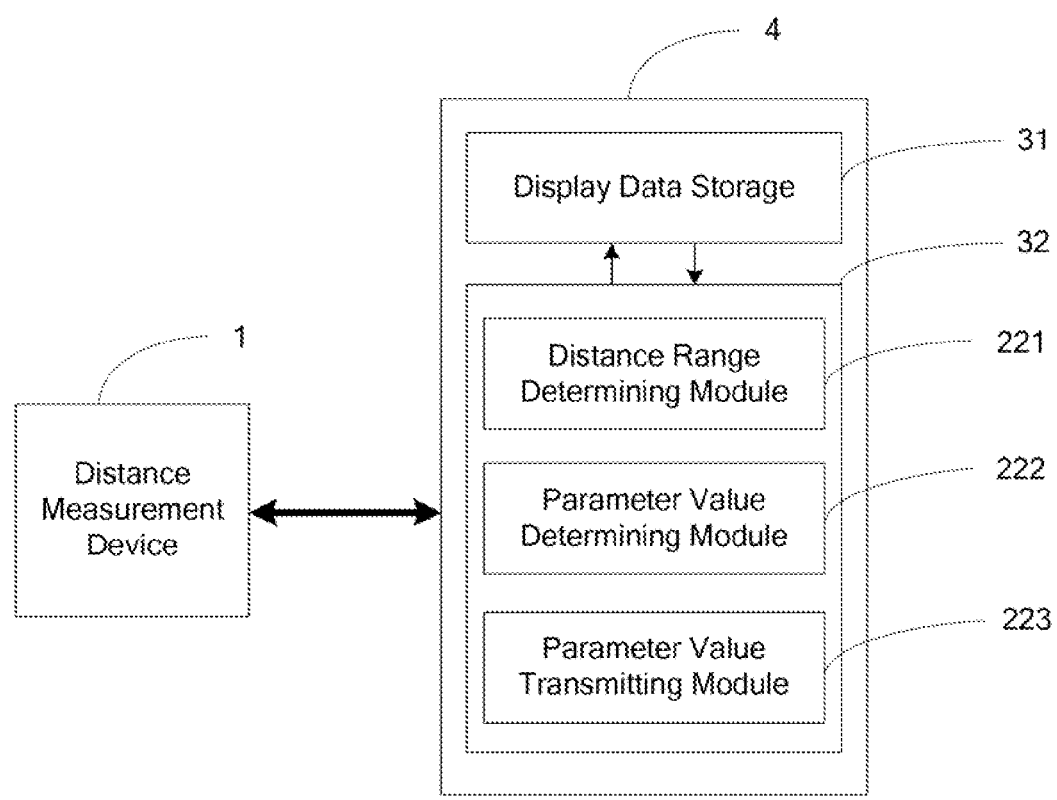
FIG. 3 is an exemplary hardware infrastructure diagram in accordance with a second preferred embodiment of the present invention.

FIG. 3 is an exemplary hardware infrastructure diagram of an automatic adjusting parameters system for a second display device in accordance with a second preferred embodiment of the present invention. The difference between the second preferred embodiment with the first preferred embodiment is that the host 2 is unnecessary in the second preferred embodiment, the parameter management table is stored in a display data storage 31 of the second display device 4, and the distance range determining module 221, a parameter value determining module 222, and a parameter value transmitting module 223 are implemented by an MCU 32 of the second display device 4. The automatic parameters adjusting method according to the system of the second preferred embodiment can refer to FIG. 2.

Although the present invention has been specifically described on the basis of preferred embodiments and preferred methods, the invention is not to be construed as being limited thereto. Various changes or modifications may be made to the embodiments and methods without departing from the scope and spirit of the invention.

What is claimed is:

1. A system for automatically adjusting parameters of a display device, comprising:
    a display device;
    a distance measurement device for measuring a current distance between a user and the display device; and
    a host, comprising:
        a data storage for storing a parameter management table which lists a series of distance ranges and corresponding parameter values of the display device, wherein the parameters comprise a luminance parameter, a contrast parameter, and a color temperature parameter; and
        a CPU for receiving the current distance transmitted from the distance measurement device, determining a particular distance range which the current distance falls in, determining corresponding parameter values of the particular distance range according to the parameter management table, and transmitting the parameter values to the display device;
    wherein, the display device adjusts parameters thereof according to the parameter values transmitted from the host.

2. The system as described in claim 1, wherein the parameter management table has a distance range of greater than or equal to a predetermined value, and a luminance value corresponding to the distance range is set as "0".

3. The system as described in claim 2, wherein the current distance falls in the distance range of greater than or equal to a predetermined value when the distance measurement device detects no user in front of the display device.

4. An automatic parameters adjusting system comprising:
    a display device;
    a distance measurement device for measuring a current distance between user and the display device;
    the display device comprising:
        a data storage for storing a parameter management table which lists a series of distance range and corresponding parameter values of the display device, wherein the parameters comprise a luminance, a contrast, and a color temperature;
        a MCU for receiving the current distance transmitted from the distance measurement device, determining a particular distance range which the distance falls in, determining corresponding parameter values of the particular distance range according to the parameter management table, and transmitting the parameter values to the display device;
    wherein, the display device adjusts parameters thereof according to the parameter values of the particular distance range.

5. The system as described in claim 4, wherein the parameter management table have a distance range of greater than or equal to a predetermined value, and luminance value corresponding to this distance range is set as "0".

6. The system as described in claim 5, wherein the distance falls in the distance range of greater than or equal to a predetermined value when the distance measurement device detects no people in front of the display device.

7. A method for automatically adjusting parameters of a display device, comprising:
    measuring a current distance between a user and the display device;
    determining a particular distance range which the current distance falls in;
    determining corresponding parameter values of the particular distance range according to a parameter management table which lists a series of distance ranges and corresponding parameter values of the display device, wherein the parameters comprise a luminance, a contrast, and a color temperature;
    transmitting the parameter values to the display device;
    adjusting parameters of the display device according to the parameter values of the particular distance range.

8. The method as described in claim 7, further comprising comparing the particular distance range with a distance range corresponding to current parameter values of the display device when the particular distance range is determined, and then determining corresponding parameter values of the particular distance range when the particular distance range is same as the distance range corresponding to current parameter values.

* * * * *